(12) United States Patent
O'Neill et al.

(10) Patent No.: US 11,448,515 B2
(45) Date of Patent: Sep. 20, 2022

(54) METHODS AND SYSTEMS FOR A MOTOR VEHICLE

(71) Applicant: Ford Global Technologies, LLC, Dearborn, MI (US)

(72) Inventors: Jon O'Neill, Erith (GB); Patrick Corbett, Saint Neots (GB)

(73) Assignee: Ford Global Technologies, LLC, Dearborn, MI (US)

(*) Notice: Subject to any disclaimer, the term of this patent is extended or adjusted under 35 U.S.C. 154(b) by 269 days.

(21) Appl. No.: 16/914,758

(22) Filed: Jun. 29, 2020

(65) Prior Publication Data
US 2021/0333118 A1 Oct. 28, 2021

(30) Foreign Application Priority Data
Jul. 1, 2019 (GB) .................................... 1909456

(51) Int. Cl.
*G05D 1/02* (2020.01)
*G01C 21/34* (2006.01)
(Continued)

(52) U.S. Cl.
CPC ......... *G01C 21/3469* (2013.01); *B60W 20/16* (2016.01); *G01C 21/3461* (2013.01);
(Continued)

(58) Field of Classification Search
CPC ........... G01C 21/3469; G01C 21/3461; B60W 20/16; B60W 2050/0075; B60W 2556/10; B60W 20/12; B60W 2552/00; B60W 2556/50; B60W 2710/06; B60W 2710/248; B60W 2710/305; B60W 30/188; B60W 40/02; B60W 50/0097; B60W 40/12; B60W 30/18; G07C 5/008; G07C 5/0808; H04W 4/46; H04W 4/80; F02D 29/02; F02D 41/005; F02D 37/02; F02D 41/40; F02D 41/1453; F02D 2041/1412;
(Continued)

(56) References Cited

U.S. PATENT DOCUMENTS

2004/0093264 A1    5/2004  Shimizu
2008/0275628 A1*  11/2008  Xu ................... G08G 1/096741
                                                           701/117
(Continued)

FOREIGN PATENT DOCUMENTS

DE    102014214489 A1   1/2016
EP         3480076 A1   5/2019
WO        2008032075 A2   3/2008

OTHER PUBLICATIONS

Great Britain Intellectual Property Office, Search and Examination Report under Sections 17 and 18(3) Issued in Application No. GB1909456.4, dated May 7, 2020, 6 pages.

*Primary Examiner* — Vivek D Koppikar
*Assistant Examiner* — Dominick Mulder
(74) *Attorney, Agent, or Firm* — Vincent Mastrogiacomo; McCoy Russell LLP

(57) ABSTRACT

Methods and systems are provided for emissions reduction in a vehicle. In one example, a method includes pre-emptively adjusting engine operating parameters in response to an anticipated emissions causal event. The emissions causal event lasting for less than a threshold period of time or less than a threshold distance.

18 Claims, 4 Drawing Sheets

(51) Int. Cl.
  *B60W 20/16*  (2016.01)
  *H04W 4/46*   (2018.01)
  *H04W 4/80*   (2018.01)
  *G07C 5/00*   (2006.01)
  *G07C 5/08*   (2006.01)

(52) U.S. Cl.
  CPC ........... *G07C 5/008* (2013.01); *G07C 5/0808* (2013.01); *H04W 4/46* (2018.02); *H04W 4/80* (2018.02)

(58) Field of Classification Search
  CPC ........... F02D 2200/701; F02D 2250/36; F02D 2250/38; B01D 2257/504
  See application file for complete search history.

(56) References Cited

U.S. PATENT DOCUMENTS

| | | | |
|---|---|---|---|
| 2009/0171549 A1* | 7/2009  | Hyde     | F02D 41/1438 60/274 |
| 2011/0191015 A1* | 8/2011  | Rychlak  | G01C 21/3469 701/532 |
| 2011/0231055 A1  | 9/2011  | Knight et al. | |
| 2011/0264317 A1  | 10/2011 | Druenert et al. | |
| 2012/0226435 A1* | 9/2012  | Yuasa    | G01C 21/3453 701/123 |
| 2016/0280203 A1* | 9/2016  | Yang     | B60W 10/06 |
| 2016/0358495 A1  | 12/2016 | Bushell  | |
| 2018/0170349 A1  | 6/2018  | Jobson et al. | |
| 2018/0273047 A1* | 9/2018  | Wang     | B60W 30/18154 |
| 2019/0145789 A1* | 5/2019  | Li       | G06N 20/00 701/123 |
| 2021/0031768 A1* | 2/2021  | Yano     | B60W 30/18018 |

\* cited by examiner

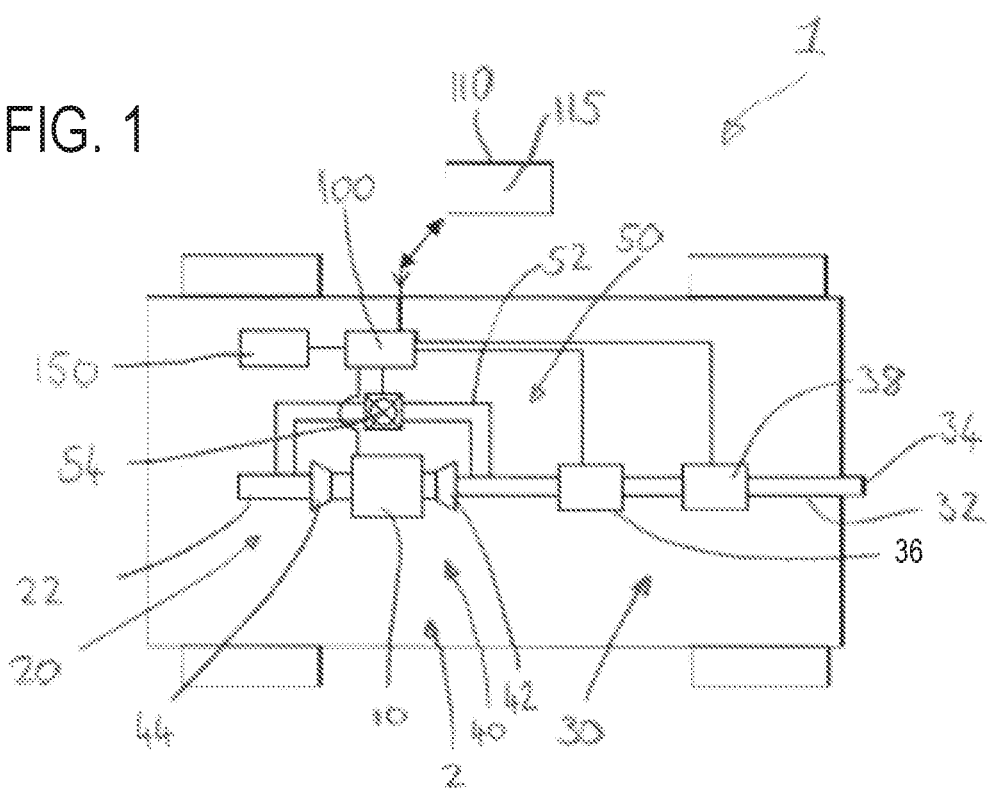

METHODS AND SYSTEMS FOR A MOTOR VEHICLE

CROSS REFERENCE TO RELATED APPLICATIONS

The present application claims priority to United Kingdom Patent Application No. 1909456.4 filed on Jul. 1, 2019. The entire contents of the above-listed application is hereby incorporated by reference for all purposes.

FIELD

The present description relates generally to predicting locations corresponding to increased emissions.

BACKGROUND/SUMMARY

Motor vehicles often comprise a plurality of emissions control systems that operate to control, e.g. reduce, the emissions of one or more pollutants by the motor vehicle.

For example, the motor vehicle may comprise an Exhaust Gas Recirculation (EGR) system, such as a high pressure or a low pressure EGR system, arranged to recirculate a portion of the exhaust gases to be reintroduced into the inlet of the engine. Replacing a portion of the oxygen rich inlet gases with burnt exhaust gases lowers the peak temperature of combustion within the engine cylinders, thereby reducing the formation of nitrogen oxides ($NO_x$).

The motor vehicle may further comprise one or more exhaust gas after-treatment devices that operate to reduce the concentrations of one or more pollutants within the exhaust gases.

Typically, the operations of an engine of the motor vehicle and any emissions control systems of the motor vehicle are controlled over the course of a drive cycle performed by the motor vehicle to maintain average emissions of the motor vehicle within desirable limits for the drive cycle and/or in order to achieve a desirable conformity factor (CF) as observed in in Real World Driving events according to emission legislation guidelines. For example, the frequency with which one or more exhaust gas treatment devices of the motor vehicle are regenerated may be controlled in order to maintain average emissions of the motor vehicle within desirable limits and/or to achieve a desirable CF.

As awareness and concerns about emissions and climate change increase, systems and methods that achieve small but significant improvements in emissions over a vehicle drive cycle are desirable. Particularly, when such improvements are multiplied by the numbers of vehicles operating on the roads. In one example, portions of a journey may correspond to increased emissions relate to desirable limits. These portions decrease emissions efficiency and emit In one example, the issues described above may be addressed by a method for operating a motor vehicle. The method comprises determining a planned or predicted route of the motor vehicle and identifying an emissions causal event along the planned or predicted route. The emissions causal event, such as a convergence or narrowing of lanes, traffic light, e.g. permanent or temporary traffic light, speed bump or other driving event, corresponds to a period of operation of the motor vehicle during which an emissions value of the vehicle is increased, e.g. expected to be increased by more than a threshold emissions amount, relative to the baseline emissions value of the motor vehicle. The method further comprises identifying a location of the emissions causal event and pre-emptively adjusting one or more operating parameters of the motor vehicle in order to reduce the emissions value of the motor vehicle when the motor vehicle travels through the identified location. In this way, emissions during the emission causal event may be reduced to an amount with a desired tolerance band.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 shows a schematic plan view of a motor vehicle according to arrangements of the present disclosure;

FIG. 2 shows a flow chart depicting a method of operating a motor vehicle according to arrangements of the present disclosure;

DETAILED DESCRIPTION

Figure 3:
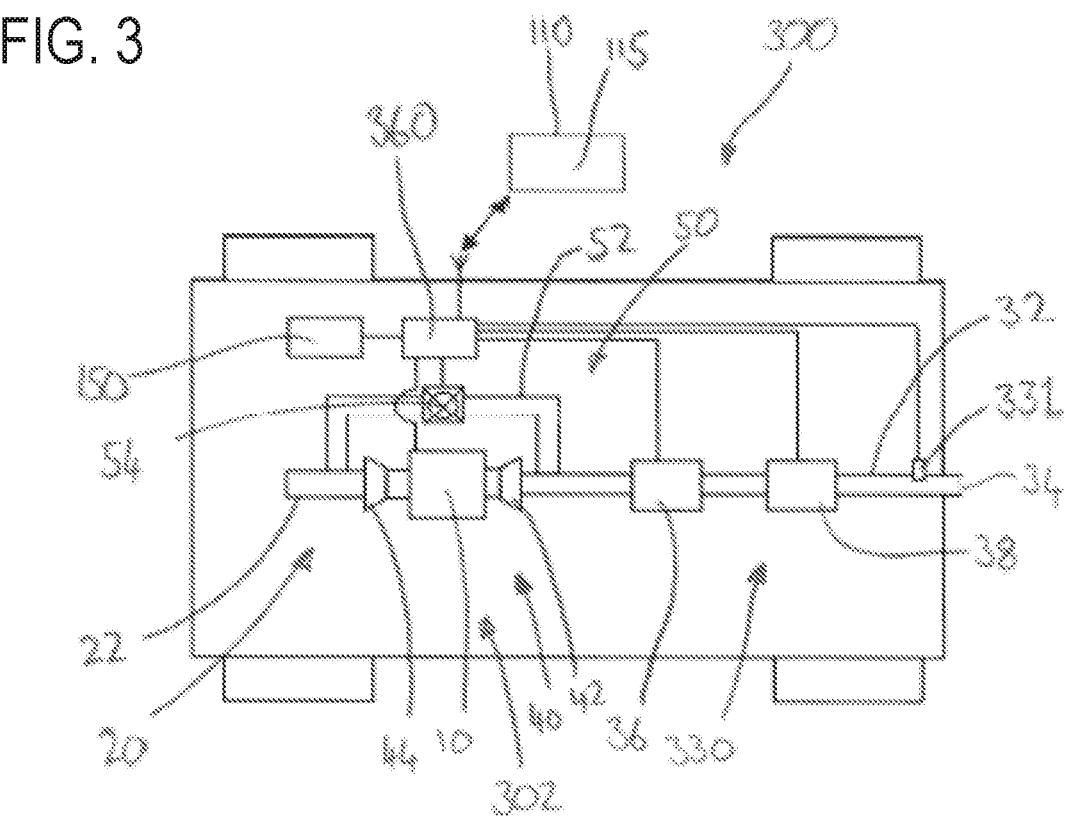
FIG. 3 shows a schematic plan view of a motor vehicle accordingly to arrangements of the present disclosure.
Figure 4:
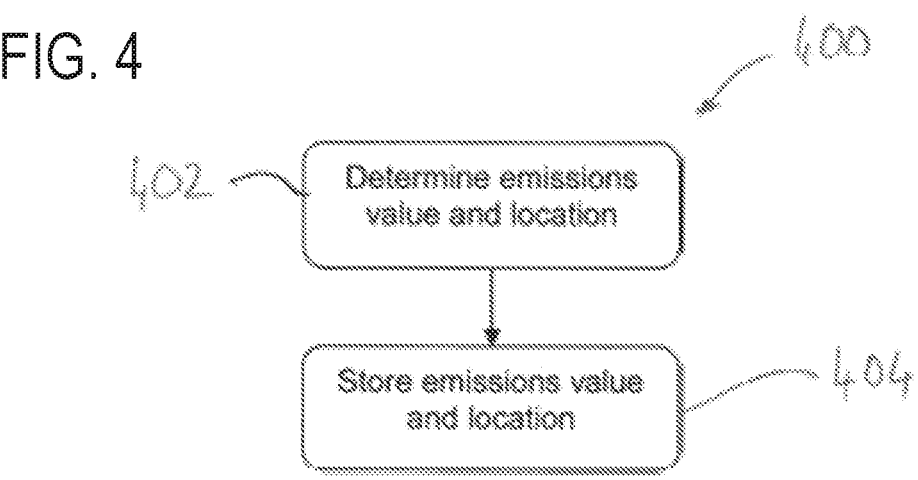
FIG. 4 shows a flow chart depicting a method of operating a motor vehicle according to arrangements of the present disclosure.
Figure 5:
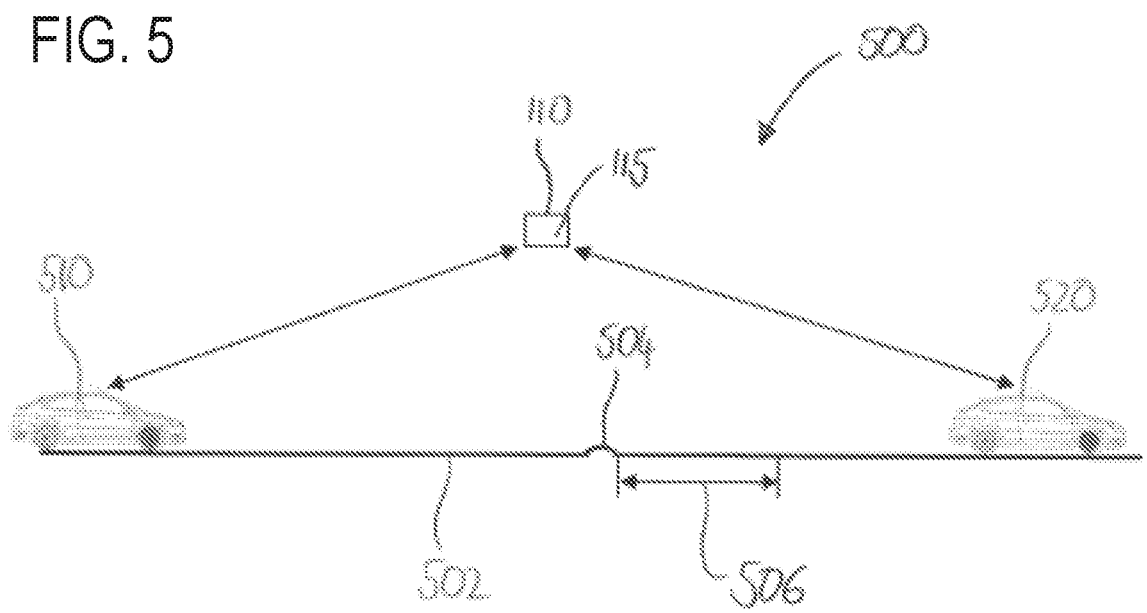
FIG. 5 shows a schematic view of a system of motor vehicles according to arrangements of the present disclosure.

The following description relates to systems and methods for operating a motor vehicle with respect to minimizing emissions therefrom. A method may include determining a planned or predicted route of the motor vehicle. The method, as illustrated in FIG. 2, may further include identifying an emissions causal event along the planned or predicted route, the emissions causal event corresponds to a period of operation of the motor vehicle during which an emissions value of the vehicle is increased or expected to increase relative to baseline (e.g., average) emission values. The method further includes identifying a location of the emissions causal event and pre-emptively adjusting one or more operating parameters of the motor vehicle to reduce an emissions value. Examples of the motor vehicles are illustrated in FIGS. 1 and 3. An example of a method for determining emissions causal events along a route and storing the information is illustrated in FIG. 4. FIG. 5 illustrates a vehicle journey with at least one emissions causal event.

Figure 6:
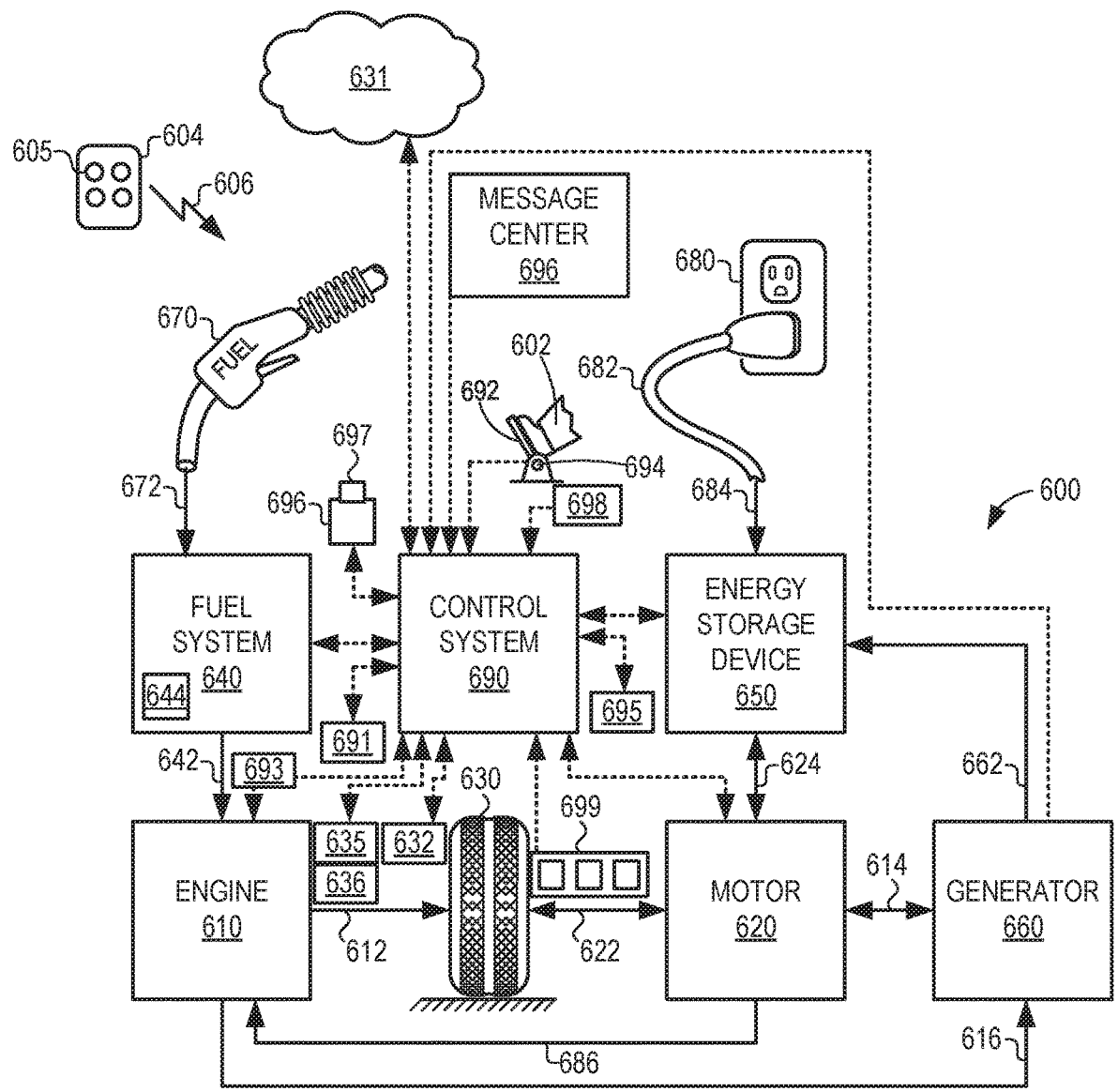
FIG. 6 illustrates an example of a low-emissions vehicle of a vehicle fleet comprising a fast response emissions sensor.

In one example, the emissions causal event is determined for a low-emissions vehicle, wherein the low-emissions vehicle is one vehicle of a plurality of vehicles included in a vehicle fleet. The emissions causal event may be detected via an emissions sensor, such as a fast response emissions sensor, arranged in the low-emissions vehicle. However, the fast response emissions sensor may be expensive relative to other sensors due to its fine-tuning and ability to associate emissions with a single piston stroke of an engine. As such, it may be desired to limit a number of fast response emissions sensors introduced to the plurality of vehicles in the vehicle fleet. To decrease this number, only low-emissions vehicles of the vehicle fleet may comprise the fast response emissions sensors. In one example, lower emissions and/or higher-efficiency vehicles include vehicles with one or more of reduced fuel consumption, reduced emissions production, hybrid capabilities, lower combustion temperatures, and the like. As such, a location of an emissions causal event for the low-emissions vehicles may be assumed to correspond to a location of an emissions causal event for higher emissions vehicles of the vehicle fleet. An example of a low-emissions vehicle comprising the fast response emissions sensor along with a communication network for relaying the location to a database or to other vehicle is illustrated in FIG. 6.

The baseline emissions value may be an expected average emissions value of the vehicle, e.g. for a current drive cycle, past drive cycle, or combination thereof. Alternatively, the baseline emissions value may be an expected average emissions value for one or more previous and/or subsequent sections of a route to be performed by the motor vehicle. The baseline emissions value may be an average emissions value of the vehicle when not travelling through an emissions causal event.

The term drive cycle is used within the specification to refer to any random or planned drive event by the vehicle owner or operator. A drive cycle may begin at a key-on, or engine start, event and may end with a key-off, or engine stop event. A drive cycle could also represent a legislative laboratory drive cycle including on-road Real World Driving events.

For a vehicle with a start/stop feature, a journey may include a starting point and an end point, with a plurality of drive cycles occurring therebetween. Each drive cycle may be monitored for an emission causal event, each drive cycle defined by an engine start and an engine stop. For example, a first drive cycle comprises a first engine start and a first engine stop. A second drive cycle, subsequent the first drive cycle, begins via a second engine start following the first engine stop. The engine start and the engine stop may be executed manually via the vehicle operator via a key or actuation of a button. Additionally or alternatively, one or more of the engine start and the engine stop may be executed automatically via a start/stop feature of the vehicle and not via direct instruction from the vehicle operator.

The emissions causal event may correspond to a period of operation of the motor vehicle during which the emissions value of the vehicle is increased, e.g. expected to be increased, for a length of time less than a threshold period of time, e.g. relative to a baseline or average emissions value, e.g. by a threshold amount. In one example, the threshold amount is two or greater standard deviations above the baseline emissions value.

Identifying the emissions causal event may comprise identifying a period of less than the threshold period of time along the predicted route during which an emissions value of the motor vehicle is predicted to be higher than an average emissions of the vehicle, e.g. during the current drive cycle, one or more past drive cycles or combinations thereof. Alternatively, identifying the emissions causal event may comprise identifying a period of less than the threshold period of time along the predicted route during which an emissions value of the motor vehicle is predicted to be higher than an emissions value corresponding to one or more other sections of route, e.g. by a predetermined amount.

The threshold period of time may be between 1 second and 60 seconds or between 1 second and 20 seconds. The threshold period of time may be less than or equal to 20 seconds, less than or equal to 10 seconds, less than or equal to 5 seconds, less than or equal to 4 seconds, less than or equal to 3 seconds, less than or equal to 2 seconds or less than or equal to 1 second.

The emissions causal event may correspond to a period of operation of the motor vehicle during which the vehicle travels a distance less than a threshold distance. The threshold distance may be between 1 m and 500 m. The threshold distance may be less than or equal to 500 m, 400 m, 300 m, 200 m, 100 m, 50 m, 30 m, 20 m, 10 m, 5 m, 2 m or 1 m.

Identifying the emissions causal event may comprise identifying a section of the planned or predicted route of the vehicle, the section having a length of less than the threshold length, over which an emissions value of the motor vehicle is predicted to be higher than average emissions of the vehicle, e.g. during the current drive cycle, one or more past drive cycles or combinations thereof. Alternatively, identifying the emissions causal event may comprise identifying a section of the planned or predicted route of the vehicle, the section having a length of less than the threshold length, over which an emissions value of the motor vehicle is predicted to be higher than an emissions value corresponding to one or more other sections of route, e.g. by a predetermined amount.

Identifying the emissions causal event may comprise analyzing one or more emissions values and associated locations stored in a database accessible to the vehicle. The emissions values and associated locations may have been stored previously in the database by the vehicle, e.g. during a prior drive cycle, and/or another vehicle.

Identifying the emissions causal event may comprise identifying a vehicle classification associated with the emissions value. The relevance of the emissions value may be determined based on the associated vehicle classification and the classification of the vehicle. The emissions causal event may be identified based on the relevance. For example, if the vehicle classification associated with the emissions value is a light hybrid vehicle classification, the emissions value may be considered relevant by all vehicles, e.g. light goods vehicles, heavy goods vehicles and other hybrid and non-hybrid vehicles. If the vehicle classification associated with the emissions value is a heavy goods vehicle classification, the emissions value may be considered irrelevant by a light goods vehicle or hybrid vehicle.

The method may further comprise determining whether an emissions causal event is a temporary event temporally affecting vehicles travelling through the location associated with the emissions causal event. The method may comprise a step of identifying an emissions causal event temporarily existing along the planned or predicted route during which the emissions of the vehicle are expected to be increased, relative to a baseline or average emissions value of the motor vehicle, for a predetermined period of time.

For example, the database accessible to the vehicle may comprise historical emissions values and the vehicle may determine whether the emissions causal event is a temporary event based on the historical emissions values associated with the location. The historical emissions values may be compared with more recent emissions values associated with the same location. The operating parameters of the engine may be adjusted pre-emptively if the emissions causal event is a temporary event, e.g. if recent emissions values indicate an emissions causal event, whilst historical emissions values do not.

The method may comprise predicting emissions values relating to the emission of two or more different pollutants during the emissions causal event. The method may further comprise pre-emptively adjusting one or more operating parameters of the motor vehicle in order to balance or optimize the emissions of the two or more different pollutants when the motor vehicle travels through the identified location.

The operating parameters of the motor may comprise one or more of a fuel injector pattern, a fuel injection quantity, a fuel injection timing, a fuel rail pressure, a valve timing, a spark timing, a turbocharger boost pressure, an exhaust gas recirculation rate, e.g. low pressure and/or high pressure exhaust gas recirculation rate, power, e.g. battery power, truncation, battery charge limit, e.g. for hybrid vehicles; and other desirable operating parameters. As such, the method may include decreasing a fuel injection angle/penetration, decreasing the fuel injection quantity, retarding the fuel injection timing, decreasing the fuel rail pressure, retard the valve timing, retard the spark timing, decreasing the turbocharger boost pressure, decreasing the exhaust gas recirculation rate, and decreasing a battery power output or a battery recharging amount. Additionally or alternatively, the method may include increasing a fuel injection angle/penetration, increasing the fuel injection quantity, advancing the fuel injection timing, increasing the fuel rail pressure, advancing the valve timing, advancing the spark timing, increasing the turbocharger boost pressure, increasing the exhaust gas recirculation rate, and increasing a battery power output or a battery recharging amount.

The emissions value may comprise a rate of emission of one or more of nitrogen oxides, ozone, unburnt hydrocarbons, particulate matter, such as particles having a diameter of less than or equal to 10 micrometers (PM10) and/or particles having a diameter of less than or equal to 2.5 micrometers (PM2.5), carbon dioxide, carbon monoxide, and other emissions.

According to another aspect of the present disclosure, there is provided a method of operating a motor vehicle, the method comprising determining a planned or predicted route of the motor vehicle, identifying a temporary emissions causal event along the planned or predicted route, the temporary emissions causal event being a temporary event during which an emissions value of the vehicle is expected to be increased, relative to the baseline emissions value of the motor vehicle, identifying a location associated with the emissions causal event, and pre-emptively adjusting one or more operating parameters of the engine in order to reduce the emissions value of the motor vehicle when the motor vehicle travels through the identified location.

According to another aspect of the present disclosure, there is provided a method of operating a motor vehicle, the motor vehicle comprising an engine, a fast response emissions sensor and a navigation system configured to determine a location of the motor vehicle, wherein the method comprises determining an emissions value of the motor vehicle and a location associated with the emissions value, and storing the emissions value and determined location in a memory associated with, e.g. accessible to, the motor vehicle.

A fast response emissions sensor may be an emissions sensor capable of determining a substantially instantaneous emissions value, e.g. an emissions value associated with a particular portion of a drive cycle. For example, the fast response emissions sensor may be capable of determining an emissions value associated with a particular period of time or with a particular distance travelled by the motor vehicle. The fast response emissions sensor may be capable of determining an emissions value corresponding to a period of operation of the motor vehicle of less than the above-mentioned threshold period, such as less than or equal to 10 seconds less than or equal to 5 seconds, less than or equal to 4 seconds, less than or equal to 3 seconds, less than or equal to 2 seconds or less than or equal to 1 second, or during which the vehicle has travelled less than the above-mentioned threshold distance, such as less than or equal to 500 m, 400 m, 300 m, 200 m, 100 m, 50 m, 30 m, 20 m, 10 m, 5 m, 2 m or 1 m.

The emissions value may be associated with a period of operation of the vehicle less than a threshold period of time, e.g. the above-mentioned threshold period of time and/or during which the vehicle has travelled less than a threshold distance, e.g. the above mentioned threshold distance.

In some arrangements, the fast response emissions sensor may be capable of determining an emissions value associated with a single revolution or piston stroke of an engine of the motor vehicle.

The method may comprise identifying an emissions causal event, the emissions causal event being a period of operation of the motor vehicle during which an emissions value of the vehicle is increased, relative to the baseline or average emissions value of the motor vehicle, e.g. during a current drive cycle, past drive cycle or combination thereof, or relative to an expected average emissions value for a subsequent section of the drive cycle. The method may further comprise identifying a location associated with the emissions causal event, e.g. based on emissions values measured by the fast response emissions sensor and/or stored in the memory.

The method may comprise pre-emptively adjusting one or more operating parameters of the engine in order to reduce the emissions value of the motor vehicle when the motor vehicle travels through the identified location. Additionally or alternatively, the method may comprise storing the location associated with the emissions causal event in the memory associated with the motor vehicle.

According to another aspect of the present disclosure there is provided a method of operating a motor vehicle, the motor vehicle comprising an engine, a fast response emissions sensor and a navigation system configured to determine a location of the motor vehicle. The method comprises determining an emissions value of the motor vehicle and a location associated with the emissions value, identifying an emissions causal event, the emissions causal event being a period of operation of the motor vehicle during which an emissions value of the vehicle is increased, relative to the baseline emissions value of the motor vehicle, and identifying a location associated with the emissions causal event; and storing the location associated with the emissions causal event in a memory associated with, e.g. accessible to, the motor vehicle.

With reference to FIG. 1, a motor vehicle 1 according to arrangements of the present disclosure comprises a powertrain system 2, a controller 100 configured to control the operation of the motor vehicle 1, e.g. the powertrain system 2, and a navigation controller 150.

In the arrangement shown in FIG. 1, a single controller 100 is provided for controlling the operation of the motor vehicle 1. However, in other arrangements, the motor vehicle may comprise any number of controllers, each comprising any number of modules, for controlling its operation. The controller 100 may comprise non-transitory memory on which instructions are stored that when executed enable the controller to adjust operation of the motor vehicle 1. The controller 100 may receive inputs from one or more sensors and actuators and provide an output to one or more sensors and actuators.

The navigation controller 150 is configured to determine a location of the motor vehicle 1 and a route to be travelled by the motor vehicle. The route may be a planned route, which has been input by an occupant of the motor vehicle or determined by the navigation controller 150 based on a destination input by the occupant. Alternatively, the route may be a predicted route, e.g. determined by the navigation controller 150 based on the location of the vehicle and one or more past destinations of the vehicle. The one or more past destinations of the vehicle may be correlated to a current time, day of the week, month of the year, and the like. Additionally or alternatively, the route may be predicted based on data in a calendar and/or a schedule of the vehicle operator.

In the arrangement shown, the navigation controller 150 is a dedicated controller or control module. However, in other arrangements, the navigation controller 150 may be part, e.g. a module, of the controller 100.

The powertrain system 2 comprises an engine 10, an inlet system 20, an exhaust system 30, a turbocharger 40 and an EGR system 50.

In the arrangement shown in FIG. 1, the engine 10 is a turbocharged diesel engine. However, it is equally envisaged that the vehicle 1 may comprise any other type of engine, such as a petrol engine. Additionally or alternatively the engine may be naturally aspirated or comprise a supercharger and/or be provided with some other form of forced induction. In some arrangements, the vehicle may comprise an additional motor, such as an electric motor, and the engine 10 may be part of a hybrid drive system. In further arrangements, the vehicle may be an electric vehicle comprising an electric motor in place of the diesel engine.

The exhaust system 30 comprises an exhaust duct 32 extending from the engine 10 to an exhaust outlet 34 of the vehicle 1. The exhaust system 30 may comprise a first exhaust after-treatment device 36, such as a diesel oxidation catalyst or a particulate filter, and may further comprise a second exhaust treatment device 38, such as a $NO_X$ trap or a Selective Catalytic Reduction (SCR) device. In other arrangements, the exhaust system 30 may comprise any other combination of the exhaust after-treatment devices mentioned above. Furthermore, the exhaust system 30 may comprise one or more other exhaust after-treatment devices in addition to or as an alternative to the first and second exhaust after-treatment devices.

The EGR system 50 comprises an EGR duct 52 configured to carry a portion of the exhaust gases from the exhaust duct 32 to an inlet duct 22 of the inlet system 20, to be reintroduced into the combustion chambers of the engine 10. The flow of exhaust gases through the EGR duct 52 is controlled by one or more EGR valves 54. The opening position of the EGR valve 54 may be controlled by the controller 100. The controller 100 may apply Proportional, Integral and/or Derivative (PID) control to control the opening position of the EGR valve, e.g. at least partially based on a position of an accelerator pedal of the vehicle.

In the arrangement shown, the EGR system 50 is a low pressure EGR system configured to recirculate exhaust gases that have been expanded through a turbine 42 of the turbocharger 40 to a position upstream of a compressor 44 of the turbocharger. In other arrangements, the motor vehicle 1 may additionally or alternatively comprise a high pressure EGR system configured to recirculate exhaust gases from upstream of the turbine 42 to a position downstream of the compressor 44.

During a drive cycle performed by the motor vehicle, the engine 10 operates to combust fuel in order to provide power to drive the vehicle 1, and exhaust gases produced during the combustion are exhausted via the exhaust system 30.

During the drive cycle, the controller 100 may calculate one or more emissions values, e.g. predicted emissions values, of the motor vehicle based on operating conditions of the motor vehicle. For example, the controller 100 may calculate the one or more emissions values based on operating conditions of the engine 10, turbocharger 40, EGR system 50 and any exhaust after-treatment devices provided on the vehicle, such as the first and second exhaust after-treatment devices 36, 38.

The controller 100 may control one or more operating parameters of the motor vehicle 1 at least partially based on the emissions values, in order to maintain the amounts of one or more pollutants being emitted by the vehicle within desirable limits. In particular, the controller 100 may adjust the operation of the engine 10 by adjusting one or more of the fuel injector pattern, injection quantity, injection timing, fuel rail pressure, valve timing and spark timing (in the case of a spark ignition engine). Additionally or alternatively, the controller 100 may control the operation of the turbocharger 40 to control the turbocharger boost pressure. Additionally or alternatively, again, the controller 100 may control the position of the EGR valve 54 at least partially based on the one or more of the emissions values.

Furthermore, the controller 100 may control the operation of the first and/or second exhaust after-treatment devices 36, 38 in order to affect the emissions values of the motor vehicle.

The controller 100 may control the operation of one or more of the exhaust after-treatment devices directly. For example, when the exhaust after-treatment device comprises an SCR device, the controller 100 may control the operation of the SCR device by controlling a dosing of a reductant supplied to the SCR device.

Additionally or alternatively, the controller 100 may control the operation of one or more of the exhaust after-treatment devices indirectly, e.g. by controlling one or more operating parameters of the engine 10, turbocharger 40 and/or EGR system 50 in order to affect the operation of the exhaust after treatment device. In particular, the controller 100 may control the operation of the engine 10 to control the temperature of exhaust gases and thereby control the efficacy of the exhaust after-treatment devices.

Controlling the operating parameters of the engine 10, turbocharger 40, and/or EGR system 50 may further enable the controller 100 to control a regeneration event of one or more of the exhaust after-treatment devices, in order to control their efficiency and efficacy in removing pollutants from the exhaust gases.

In one arrangement, if the controller 100 determines, e.g. predicts, that the emission of a particular pollutant, such as carbon monoxide CO, has increased above a desirable limit, the controller 100 controls the operation of the engine 10, turbocharger 40 and/or EGR system 50 to increase the temperature of the exhaust gases, in order to trigger a regeneration event of the one or more of first and second exhaust after treatment devices, such as a diesel oxidation catalyst. Following the regeneration event, the efficacy of one or more of the exhaust after treatment devices 36, 38 may be increased, which may enable the emission of the particular pollutant to be reduced below the desirable limit during a subsequence portion of the drive cycle.

In some arrangements, if the controller 100 determines, e.g. predicts, that the emission of a particular pollutant, such as $NO_X$, has increased above a desirable limit, the controller 100 controls the operation of the engine 10, turbocharger 40 and/or EGR system 50 to reduce production of the particular pollutant during combustion within the engine cylinders. For example, the controller may increase a rate of exhaust gas recirculation in order to reduce an amount of $NO_X$ being produced, and thereby reduce the emissions of $NO_X$ below the desirable limit over a subsequent portion of the drive cycle.

Controlling the operation of the motor vehicle 1 to affect, e.g. reduce, one emission value may affect another emission differently. For example, increasing a rate of exhaust gas recirculation in order to reduce an amount of $NO_X$ being emitted by the vehicle 1 may increase an amount of particular matter being produced. The controller 100 may therefore be configured to control the operating parameters of the vehicle in order to balance the production of different emissions over the course of the drive cycle.

Furthermore, controlling the operation of the motor vehicle 1 to affect, e.g. reduce, one or more emissions values may affect, e.g. increase, a fuel consumption of the motor vehicle. For example, controlling the operation of the motor vehicle 1 may affect an instantaneous fuel consumption and/or an overall fuel consumption of the motor vehicle over the drive cycle. In one example, controlling the operation of the motor vehicle 1 to increase a temperature of the exhaust gases in order to regenerate an exhaust treatment device increases a fuel consumption of the motor vehicle.

During the course of a drive cycle of the motor vehicle, the motor vehicle may experience one or more events, lasting for a portion of the drive cycle, that act to cause the generation of one or more pollutants by the engine 10, and/or the emissions of the pollutants from the vehicle, to be increased for the duration of the event, e.g. for a particular period of time and/or distance travelled by the vehicle. In the present specification, such events are referred to as emissions causal events.

Emissions causal events may correspond to sections of a road along which a driver of the vehicle rapidly adjusts the speed of the vehicle in order to respond to road condition. For example, at a section of the road comprising speed bumps, the driver may reduce the speed of the vehicle as the vehicle travels over the speed bumps and may then accelerate the vehicle after passing over the speed bumps. As a further example, at sections of the road where lanes converge, a driver of the vehicle may accelerate to move into a gap between other vehicles. Emissions causal events may correspond to permanent road features or may be temporary emissions causal events, e.g. associated with temporary road features, such as temporary traffic lights, lane closures or obstructions in the road.

If the emissions causal event is sufficiently long in duration, the controller 100 may determine that the emissions of the one or more pollutants have been increased and may begin to control the operation of the motor vehicle 1 so that the emissions of the motor vehicle are reduced during the emissions causal event. However, if the duration of the emissions causal event is short, the controller 100 may not be capable of determining that emissions have increased and controlling the operation of motor vehicle to account for the increase in pollutants during the emissions causal event.

Moreover, travelling through one or more short duration, unexpected emissions causal events, may disrupt the ability of the controller 100 to balance the emissions of multiple different pollutants during the drive cycle, as the controller 100 controls the operation of the motor vehicle 1 to account for the above average emissions of one or more particular pollutants during the emissions causal event. Furthermore, the control applied by the controller 100 to retrospectively account for the emissions causal event may increase a fuel consumption of the motor vehicle over the driver cycle.

In some cases, the period of higher emissions being generated by the engine during the emissions causal event and/or the way in which the motor vehicle is controlled during the emission causal event may result in one or more of the exhaust after-treatment devices requiring regeneration earlier in the drive cycle than they would otherwise.

With reference to FIG. 2, the controller 100 may be configured to control the operation of the motor vehicle 1 according a method 200, in order to reduce the effect of emissions causal events on the emissions and fuel consumption of the motor vehicle. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 200 comprises a first step 202, in which a planned or predicted route of the motor vehicle is determined. As described above, the planned or predicted route of the motor vehicle may be determined by the navigation controller 150 of the motor vehicle.

The method 200 comprises a second step 204 in which an emissions causal event along the planned or predicted route is identified. As described above, the emissions causal event may corresponding to a period of operation of the motor vehicle during which an emissions value of the vehicle is expected to be increased, relative to a baseline, e.g. average, emissions value of the motor vehicle, e.g. during a drive cycle of the motor vehicle. The emissions value may comprise a rate or concentration of one or more of ozone, nitrogen oxides ($NO_X$), unburnt hydrocarbons, particulate matter (PM10 and/or PM2.5), carbon dioxide, and carbon monoxide (CO), and/or any other emissions it is desirable to control. In a third step 206 of the method 200 a location of the emissions causal event is determined.

The emissions causal events may be identified by analyzing one or more vehicle emissions values and associated locations stored in a database 115 accessible by the vehicle. The database 115 may be stored in a memory 110 of or accessible to the controller 100. The memory 110 may be provided on the vehicle. Alternatively, as depicted in FIG. 1, the memory 110 may be located in a remote location. For example, the memory 110 may be a cloud-based storage system. In some arrangements, the memory 110 may be distributed between a plurality of locations, e.g. between a plurality of motor vehicles and/or data centers. As depicted in FIG. 1, the controller 100 may be configured to communicate with the database using any desirable communication method in order to receive the emissions values and associated locations from the database 115.

The controller 100 may communicate with the database 115 in real time. Alternatively, the controller 100 may communicate with the database 115 periodically, e.g. every hour or day, in order to synchronize the information stored in the database 115 with information stored locally on the vehicle. In some arrangements, the controller 100 may be synchronized with the database 115 manually, e.g. during a service of the motor vehicle.

Returning to FIG. 2, the method 200 further comprises a fourth step 208, in which one or more operating parameters of the motor vehicle are adjusted pre-emptively, in order to reduce the emissions value of the motor vehicle when the motor vehicle travels through the identified location.

By pre-emptively adjusting the operating parameters of the motor vehicle, emissions of the motor vehicle during the emissions causal event may be reduced, which may reduce the overall emissions of the motor vehicle during the drive cycle. Furthermore, pre-emptively adjusting the operating parameters of the motor vehicle may enable the controller to balance the emissions of two or more pollutants during the emissions causal event. Additionally, pre-emptively adjusting the operating parameters of the motor vehicle may enable the controller 100 to control the motor vehicle in a manner that reduces overall fuel consumption of the motor vehicle during the drive cycle, e.g. compared to if the operating parameters are adjusted following the emission causal event to account for increased emissions during the emissions causal event in subsequent portions of the drive cycle. By doing this, even shorter duration emission causal events may be accounted for and emissions during the event reduced despite the short duration without affecting future driving conditions.

Pre-emptively adjusting the operating parameters of the motor vehicle may comprise controlling an operating parameter of the engine such as the fuel injector pattern, injection quantity, injection timing, fuel rail pressure, valve timing and spark timing. Additionally or alternatively, pre-emptively adjusting the operating parameters of the motor vehicle may comprise controlling the operation of the turbocharger to control a boost pressure. Additionally or alternatively again, pre-emptively adjusting the operating parameters of the motor vehicle may comprise controlling the operation of the EGR valve, for example, the PID control of the EGR valve may be adjusted for the identified emissions causal event, such that the flow rate of EGR gases is changed. In one example, the EGR flow rate is increased in response to the emissions causal event. In another example, the EGR flow rate is reduced in response to the emissions causal event.

When the motor vehicle comprises an electric motor, pre-emptively adjusting the operating parameters of the motor vehicle may comprise truncating power draw from the battery, limiting battery energy release, limiting a minimum charge level of the battery, e.g. before an engine of a hybrid vehicle is started to charge the battery.

As described above, pre-emptively adjusting the operating parameters of the motor vehicle may be desired when the emissions causal event is of a short duration, e.g. less than a threshold period of time, such that the controller 100 cannot determine the change in emissions during the event and adjust the operation of the motor vehicle accordingly during the emissions causal event. That is to say, the threshold duration is based on an amount of time where emissions may spike due to adjustments in real-world setting that are not sensed within the threshold duration by the controller 100. In such an example, once the controller has determined desired adjustments to decrease emissions during the emission causal event, the emission causal event may be complete, which may result in reduced efficiency following the emissions causal event due to the delayed adjustments provided by the controller. The emissions causal events considered by the controller 100 during the method 200 may therefore correspond to periods of operation of the motor vehicle of less than a threshold period of time, such as less than 1 minute, less than 30 second, less than 20 seconds, less than 10 seconds or less than 5 seconds.

Said another way, a vehicle may operate with a first drive cycle for a portion of a journey. The first drive cycle is not an emissions causal event and the controller may determine desired operating parameters adjustments during the first drive cycle to maintain a desired efficiency. A second drive cycle may follow the first drive cycle, wherein the second drive cycle is an emissions causal event. The second drive cycle may proceed for an amount of time less than the threshold period of time. As such, a response time of the controller may be greater than the amount of time in which the second drive cycle lasts. A third drive cycle may begin following the second drive cycle, wherein the third drive cycle is a non-emissions causal event. Based on the method of FIG. 2, adjustments provided via the prediction of the second drive cycle may occur during the second drive cycle such that the adjustments of the second drive cycle do not decrease an efficiency of the third drive cycle. If the method of FIG. 2 is not executed, then adjustments provided via the controller may be too delayed, wherein the adjustments prescribed for the second drive cycle carryover into the third drive cycle, whereby an efficiency of the third drive cycle may be reduced.

The emissions causal event may be identified, e.g. in the second step 204, by identifying a period of less than the threshold period of time along the predicted route during which an emissions value of the motor vehicle is predicted to be higher than average emissions of the vehicle, e.g. during the drive cycle.

Additionally or alternatively, the emissions causal events considered by the controller 100 during the method 200 may correspond to a period of operation of the motor vehicle during which the vehicle travels a distance less than a threshold distance, such as 500 m, 200 m, 100 m, 50 m, 10 m, 5 m, 2 m or 1 m.

The emissions causal event may be identified, e.g. in the second step 204, by identifying one or more sections of the planned or predicted route of the vehicle, the one or more sections each having a length of less than the threshold distance, over which an emissions value of the motor vehicle is predicted to be higher than the average emissions value of the vehicle.

The method 200 may further comprise a step in which it is determined whether an emissions causal event is a temporary event temporally affecting vehicles travelling through the location associated with the emissions causal event. The database 115 may be configured to store historical emissions information of the associated locations. The controller 100 may be configured to compare the historical emissions information with more recent emissions information to determine whether the emissions causal event is a temporary event. In some arrangements, the operating parameters of the engine may be adjusted pre-emptively if the emissions causal event is a temporary event, e.g. if recent emissions values indicate an emissions causal event, whilst historical emissions values do not.

In a similar way, if historical emissions information indicates the presence of an emission causal event and more recent emissions information do not. It may be determined that the emissions causal event is no longer present. In some examples, the emission causal event may be stored with a time stamp, wherein the time stamp indicates one or more of a time of day, day of the week, week of a month, and month of the year. For example, a location may be classified as an emissions causal event at 8:30 A.M. while being classified as a non-emissions causal event at 8:30 P.M. Additionally or alternatively, a location may be classified as an emissions causal event during summer mounts (e.g., June, July, August, and September) while being classified as a non-emissions causal event during non-summer months. Additionally or alternatively, a location may be classified as an emissions causal event based on public events. For example, a stadium may correspond to a location in which an emissions causal event may occur during events at the stadium, while the location of the stadium may not lead to an emissions causal event when the stadium is not in use. Furthermore, recent events may be used to update classifications of various locations, wherein recent events include construction, natural disasters, organized protests, rallies, weather, pandemics, accidents and other traffic behaviors, and the like.

As described above, the controller 100 may control the operation of the motor vehicle to balance or optimize the emissions of two or more different pollutants, such as $NO_X$ and PM, during a drive cycle. The method 200 may comprise determining, e.g. predicting, emissions values relating to two or more different pollutants during the emissions causal event. The method may further comprise pre-emptively adjusting one or more operating parameters of the motor vehicle in order to balance or optimize the emissions of the two or more different pollutants when the motor vehicle is travelling through the identified location, e.g. the emissions causal event. In some arrangements, balancing or optimizing the emissions of the two or more different pollutants may comprise reducing the emissions of one, more than one or each of the two or more different pollutants.

In order for the database 115 to be populated with the emission values and associated locations, so that the controller 100 can identify emissions causal events, e.g. in the second step 204. It may be desirable for the motor vehicle 1 to provide emissions information to the database 115 to be referred to when the motor vehicle 1 or another vehicle travels through the location of the emission causal event. However, the controller 100 may not be capable of determining an instantaneous emissions value, e.g. that can be associated with a particular location of the vehicle with sufficient accuracy to be useful for performing the method 200.

By operating according to the method 200, the emissions produced by a vehicle when passing through an emissions causal event may be less than they would have been if the operating parameters had not been adjusted. Reducing emissions in this way may reduce overall emissions produced by the vehicle during a drive cycle. Furthermore, when the vehicle is operating according to the method 200, transient increases in the production of pollutants, e.g. by the engine of the vehicle, may be reduced. The capacity of one or more of the exhaust after-treatment devices may therefore be reduced without affecting the emissions performance of the motor vehicle. Additionally, operating according to the method 200 may enable a vehicle previously incapable of meeting current emissions standards, e.g. due to the age of the vehicle, to meet the latest emissions standards, e.g. in order to be admitted into a restricted emissions zone.

With reference to FIG. 3, an instrumented motor vehicle 300 according to arrangements of the present disclosure comprises a powertrain system 302, a controller 360 configured to control the operation of the motor vehicle 1, e.g. the powertrain system 2, and the navigation controller 150.

The powertrain system 302 and the controller 360 may be similar to the powertrain system 2 and the controller 100 described above with reference to FIG. 1, and the features described in relation to the powertrain system 2 and the controller 100 may apply equally to the powertrain system 302 and the controller 360.

The powertrain system 302 differs from the powertrain system 2, in that an exhaust system 330 of the powertrain system 302 comprises one or more fast response emissions sensors 331 configured to determine a substantially instantaneous value reflecting a current amount, e.g. rate and/or concentration, of one or more pollutants within exhaust gases being emitted from the motor vehicle. For example, the fast response emissions sensors 331 may be capable of determining an emissions value of the exhaust gases reflective of the amount of one or more respective pollutants within exhaust gases being emitted from the motor vehicle e.g. averaged over a time period of less than 1 second or associated with a particular revolution or piston stroke of the vehicle's engine.

In the arrangement shown in FIG. 3, the fast response emissions sensor 331 is arranged downstream of the first and second exhaust gas treatment devices 36, 38. However, in other arrangements, the fast response emissions sensor 331 may be arranged at any location in the exhaust system 330. In some arrangements, the fast response emissions sensor may comprise a plurality of sensors arranged at a plurality of respective locations in the exhaust system 330 in order to determine the instantaneous emissions value. The instantaneous emissions value may be directly measured by the fast response emissions sensor. Alternatively, the instantaneous emissions value may be calculated based on measurements recorded by the fast response emissions sensor or plurality of fast response emissions sensors.

The fast response emissions sensor 331 may be operatively coupled to the controller 360. The controller 360 is also operatively coupled to the navigation controller 150. The controller 360 is thereby capable of associating an emissions value determined by the fast response emissions sensor 331 with a location of the motor vehicle determined by the navigation controller 150. Because the emissions vale is determined substantially instantaneously, the location associated with the emissions value may be representative of the location in which the vehicle produced an amount, e.g. rate or concentration, of emissions corresponding to the emissions value.

With reference to FIG. 4, the controller 360 may be configured to perform a method 400 according to the present disclosure. The method 400 comprises a first step 402 in which an emissions value of the motor vehicle and a location associated with the emissions value are determined. The method 400 further comprises a second step 404, in which the emissions value and vehicle location associated with the emissions value are stored in the database 115. As described above, the memory 110 in which the database 115 is stored may be provided on and/or associated with, e.g. accessible to, the motor vehicle 300.

The emissions value may be stored in the database 115 together with information defining a vehicle classification of the vehicle. The vehicle classification may be indicative of one or more emissions performances of the vehicle. For example, the vehicle classification may indicate whether the vehicle is a heavy goods vehicle, a light goods vehicle, a commercial vehicle or a passenger vehicle. Furthermore, the vehicle classification information may define one or more characteristics of a powertrain of the vehicle, such as a capacity and/or fuel type of a combustion engine of the vehicle, a hybrid drive capability of the vehicle and/or an electric only operating capability of the vehicle.

When the vehicle, or a further vehicle, is identifying an emissions causal event, based on the emissions values stored in the database 115, e.g. in the second step 204 of the method 200, the vehicle may determine the relevance of the emissions values based on the information defining the vehicle classification associated with the stored information. The emissions causal event may be identified based on the relevance of the stored emissions values. The emissions values may be considered relevant by a particular vehicle if the vehicle classification associated with the emissions values corresponds to a vehicle having the same or better emissions performance than the particular vehicle. For example, if the vehicle classification associated with a particular emissions value is a heavy goods vehicle classification, the emissions value may be considered irrelevant by a light goods vehicle or hybrid vehicle. If the vehicle classification associated with the emissions value is a light hybrid vehicle classification, the emissions value may be considered relevant by all vehicles, e.g. light goods vehicles, heavy goods vehicles and other hybrid and non-hybrid vehicles. In this way, vehicles may communicate with one another via a dedicated short-range communication network, Wi-Fi, Bluetooth, or other wireless connection elements. Vehicles with higher efficiency may be used as a threshold for vehicle with lower efficiency to determine if an emissions causal event is upcoming. Additionally or alternatively, vehicle may communicate with a server, wherein the server relays information between different vehicles of a vehicle fleet.

Fast response emissions sensors 331 may be expensive, and hence, it may be undesirable for every vehicle operating on a road network to be provided with a fast response emissions sensor 331. However, the information, e.g. the emissions values and associated locations, may be accessible to vehicles that do not comprise fast response emission sensors as well as to vehicles comprising fast response emissions sensors. In this way, all of the vehicles on the road network may benefit from the emissions information measured by the fast response emissions sensors on vehicles operation on the road network, e.g. by performing the method 200, in order to improve their emissions when travelling though emissions causal events. Vehicles comprising fast response emissions sensors 331 may perform the method 400 and the method 200 substantially simultaneously. In one example, fast response emissions sensors may be arranged in only higher efficiency vehicles, such that feedback from the sensor may be used for a greater number of vehicles than if the fast response sensor were arranged in a lower efficiency vehicle.

With reference to FIG. 5, a system 500 according to the pressure disclosure comprises a first vehicle 510, a second vehicle 520 and the memory 110 storing the database 115. The first vehicle 510 may be similar to the vehicle 1 and may not comprise a fast response emissions sensor. The second vehicle may be similar to the vehicle 300 and may comprise a fast response emissions sensor 331. In one example, the second vehicle 520 comprises an overall fuel economy rating higher than an overall fuel economy rating of the first vehicle 510. As such, it may be assumed that emissions causal events of the second vehicle 520 may result in emissions causal events for the first vehicle 510.

As shown in FIG. 5, the first vehicle 510 and the second vehicle 520 are travelling along a road 502 which includes a speed bump 504. A driver of a vehicle will typically slow the vehicle when approaching the speed bump and then accelerate the vehicle after passing over the speed bump. The vehicle may therefore produce greater than average emissions in a section of the road 506 following the speed bump. The speed bump 504 and section of the road 506 following the speed bump may therefore correspond to an emissions causal event.

As depicted, the second vehicle 520 has already travelled through the emissions causal event and may therefore have produced increase emissions when travelling though the emission causal event. The second vehicle 520 is operating according to the method 400. The controller 360 of the second vehicle may therefore have stored one or more emissions values associated with a location corresponding to the emissions causal event in the database 115.

The first vehicle 510 is about to travel through the emission causes event. The first vehicle is operating according to the method 200. When performing the method 200, the controller 100 may analyze the emissions values and associated locations stored in the database 115 by the controller 360 of the second vehicle 520. The first vehicle 510 may therefore identify the speed bump 504 and section of the road 506 following the speed bump as an emissions causal event.

In the arrangement shown, the first vehicle 510 has the same vehicle classification as the second vehicle 520, and hence, the emissions values stored by the second vehicle 520 may be considered relevant by the first vehicle 510. It is also envisaged that the classification of the first vehicle may be different from the classification of the second vehicle, but the first vehicle may, nevertheless, determine that the emissions values stored by the second vehicle are relevant. For example, if the second vehicle is classified as a hybrid passenger vehicle and the first vehicle is classified as a heavy goods vehicle, the first vehicle may determine that the emissions values sorted by the second vehicle are relevant for identifying an emissions causal event that may affect the first vehicle.

The controller 100 of the first vehicle 510 may therefore pre-emptively adjust one or more operating parameters of the first vehicle in order to reduce any increase in emissions of the first vehicle 510, as the first vehicle travels through the emissions causal event. In addition to reducing emissions of the first vehicle, pre-emptively adjusting the operating parameters, may enable fuel consumption of the first vehicle to be improved over a current drive cycle, as the controller 100 need not take retrospective action to reduce vehicle emissions after the first vehicle has travelled though the emissions causal event.

The second vehicle 520 may also be operating according to the method 200. Hence, if the second vehicle repeats the route along the road 502, the controller 360 of the second vehicle may identify the speed bump 504 and section of the road 506 following the speed bump as an emissions causal event and may pre-emptively adjust one or more operating parameters of the second vehicle 520.

Vehicles travelling along the road 502 and operating according to the method 400 may continue to store emissions values in the database 115. Accordingly, if the speed bump 504 is subsequently removed, this may be reflected in emissions values stored in the database 115 and vehicles subsequently travelling along the road may no longer identify an emissions causal event associated with the location along the road at which the speed bump was previously located.

The speed bump 504 is described above, with reference to FIG. 5, as an example of an emissions causal. It will be appreciated that the emissions causal event may be any other causal event, e.g. mentioned herein, and the first and second vehicles 510, 520 may operate in substantially the same way when travelling through the location of any other emissions causal event.

In one example the first vehicle 510 and the second vehicle 520 are included in a vehicle fleet. The first vehicle 510 comprises a first emissions sensor and the second vehicle 520 comprises a second emissions sensor, which is different than the first. The first emissions sensor may be configured to associate an emissions value with a piston stroke, or other portion of an engine cycle. The second emissions sensor may be configured to determine an emissions value without associating the value to a portion of the engine cycle. As such, the first sensor may be more sensitive and complex than the second sensor, resulting in a higher cost. For this reason, it may be desired to include the first sensor in only higher efficiency vehicles of the vehicle fleet to decrease manufacturing costs. Data from the first sensor may be relayed to vehicles without the first sensor in order to anticipate emissions causal events.

FIG. 6 illustrates an example vehicle propulsion system 600 which may be used in a vehicle of a vehicle fleet. In one example, the vehicle propulsion system 200 may be a non-limiting example of instrumented motor vehicle 300 of FIG. 3. The vehicle propulsion system 600 may be a first vehicle of a vehicle fleet and motor vehicle 1 of FIG. 1 may be a second vehicle of the vehicle fleet. The vehicle propulsion system 600 comprises devices configured to enable communication between the first vehicle and other vehicles of the vehicle fleet or with a server which may communicate with the other vehicles. The first vehicle may communicate locations corresponding to emissions causal events to vehicles travelling toward the location or along a similar route.

Vehicle propulsion system 600 includes a fuel burning engine 610 and a motor 620. As a non-limiting example, engine 610 comprises an internal combustion engine and motor 620 comprises an electric motor. Engine 610 may be used substantially similarly to engine 10 of FIG. 1. Motor 620 may be configured to utilize or consume a different energy source than engine 610. For example, engine 610 may consume a liquid fuel (e.g., gasoline) to produce an engine output while motor 620 may consume electrical energy to produce a motor output. As such, a vehicle with propulsion system 600 may be referred to as a hybrid electric vehicle (HEV).

Vehicle propulsion system 600 may utilize a variety of different operational modes depending on operating conditions encountered by the vehicle propulsion system. Some of these modes may enable engine 610 to be maintained in an off state (i.e., set to a deactivated state) where combustion of fuel at the engine is discontinued. For example, under select operating conditions, motor 620 may propel the vehicle via drive wheel 630 as indicated by arrow 622 while engine 610 is deactivated, which may herein be referred to as an electric-only operation.

In another example, the engine may be equipped with a start/stop (S/S) feature 693, wherein the engine 610 may be automatically shut down during times when the vehicle is not moving, or when the vehicle speed is below a threshold speed, when engine speed is below a threshold engine speed, etc. Control system 690 may be connected to engine 610 and S/S feature 693, for performing the start-stop functions. Advantages to the S/S functionality may include an improvement in fuel economy over other vehicles that do not employ such technology. During the start/stop the vehicle may be propelled via its momentum and not by the engine 610 or the motor 620.

During other operating conditions, engine 610 may be set to a deactivated state (as described above) while motor 620 may be operated to charge energy storage device 650. For example, motor 620 may receive wheel torque from drive wheel 630 as indicated by arrow 622 where the motor may convert the kinetic energy of the vehicle to electrical energy for storage at energy storage device 650 as indicated by arrow 624. This operation may be referred to as regenerative braking of the vehicle. Thus, motor 620 can provide a generator function in some examples. However, in other examples, generator 660 may instead receive wheel torque from drive wheel 630, where the generator may convert the kinetic energy of the vehicle to electrical energy for storage at energy storage device 650 as indicated by arrow 662. In some examples, the engine 610 may deactivate during regenerative braking and traction at the drive wheel 630 may be negative, such that the motor 620 may spin in reverse and recharge the energy storage device 650. Thus, regenerative braking may be distinguished from an electric-only operation, where the motor 620 may provide positive traction at the drive wheel 630, thereby decreasing a SOC of the energy storage device 650 while the engine 610 is deactivated.

During still other operating conditions, engine 610 may be operated by combusting fuel received from fuel system 640 as indicated by arrow 642. For example, engine 610 may be operated to propel the vehicle via drive wheel 630 as indicated by arrow 612 while motor 620 is deactivated, such as during a charge-sustaining operation. During other operating conditions, both engine 610 and motor 620 may each be operated to propel the vehicle via drive wheel 630 as indicated by arrows 612 and 622, respectively. A configuration where both the engine and the motor may selectively propel the vehicle may be referred to as a parallel type vehicle propulsion system. Note that in some examples, motor 620 may propel the vehicle via a first set of drive wheels and engine 610 may propel the vehicle via a second set of drive wheels.

In other examples, vehicle propulsion system 600 may be configured as a series type vehicle propulsion system, whereby the engine does not directly propel the drive wheels. Rather, engine 610 may be operated by power motor 620, which may in turn propel the vehicle via drive wheel 630 as indicated by arrow 622. For example, during select operating conditions, engine 610 may drive generator 660 as indicated by arrow 616, which may in turn supply electrical energy to one or more of motor 620 as indicated by arrow 614 or energy storage device 650 as indicated by arrow 662. As another example, engine 610 may be operated to drive motor 620 which may in turn provide a generator function to convert the engine output to electrical energy, where the electrical energy may be stored at energy storage device 650 for later use by the motor.

In still other examples, which will be discussed in further detail below, motor 620 may be configured to rotate engine unfueled in a forward (e.g. default orientation) or reverse orientation, using energy provided via energy storage device 650, exemplified by arrow 686.

Fuel system 640 may include one or more fuel storage tanks 644 for storing fuel on-board the vehicle. For example, fuel tank 644 may store one or more liquid fuels, including but not limited to: gasoline, diesel, and alcohol fuels. In some examples, the fuel may be stored on-board the vehicle as a blend of two or more different fuels. For example, fuel tank 644 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 610 as indicated by arrow 642. Still other suitable fuels or fuel blends may be supplied to engine 610, where they may be combusted at the engine to produce an engine output. The engine output may be utilized to propel the vehicle as indicated by arrow 612 or to recharge energy storage device 650 via motor 620 or generator 660.

In some examples, energy storage device 650 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 650 may include one or more batteries and/or capacitors. In some examples, increasing the electrical energy supplied from the energy storage device 650 may decrease an electric-only operation range, as will be described in greater detail below.

Control system 690 may communicate with one or more of engine 610, motor 620, fuel system 640, energy storage device 650, and generator 660. In some examples, control system 690 may be used similarly to controller 100 of FIG. 1. Control system 690 may receive sensory feedback information from one or more of engine 610, motor 620, fuel system 640, energy storage device 650, and generator 660. Further, control system 690 may send control signals to one or more of engine 610, motor 620, fuel system 640, energy storage device 650, and generator 660 responsive to this sensory feedback. In some examples, control system 690 may receive an indication of an operator requested output of the vehicle propulsion system from a vehicle operator 602. For example, control system 690 may receive sensory feedback from pedal position sensor 694 which communicates with pedal 692. Pedal 692 may refer schematically to a brake pedal and/or an accelerator pedal. Furthermore, in some examples control system 690 may be in communication with a remote engine start receiver 695 (or transceiver) that receives wireless signals 606 from a key fob 604 having a remote start button 605. In other examples (not shown), a remote engine start may be initiated via a cellular telephone, or smartphone based system where a user's cellular telephone sends data to a server and the server communicates with the vehicle to start the engine.

In some examples, additionally or alternatively, the vehicle propulsion system 600 may be configured to operate autonomously (e.g., without a human vehicle operator). As such, the control system 690 may determine one or more desired operating engine conditions based on estimated current driving conditions.

Energy storage device 650 may periodically receive electrical energy from a power source 680 residing external to the vehicle (e.g., not part of the vehicle) as indicated by arrow 684. As a non-limiting example, vehicle propulsion system 600 may be configured as a plug-in hybrid electric vehicle (HEV), whereby electrical energy may be supplied to energy storage device 650 from power source 680 via an electrical energy transmission cable 682. During a recharging operation of energy storage device 650 from power source 680, electrical transmission cable 682 may electrically couple energy storage device 650 and power source 680. While the vehicle propulsion system is operated to propel the vehicle, electrical transmission cable 682 may disconnect between power source 680 and energy storage device 650. Control system 690 may identify and/or control the amount of electrical energy stored at the energy storage device, which may be referred to as the state of charge (SOC).

In other examples, electrical transmission cable 682 may be omitted, where electrical energy may be received wirelessly at energy storage device 650 from power source 680. For example, energy storage device 650 may receive electrical energy from power source 680 via one or more of electromagnetic induction, radio waves, and electromagnetic resonance. As such, it should be appreciated that any suitable approach may be used for recharging energy storage device 650 from a power source that does not comprise part of the vehicle. In this way, motor 620 may propel the vehicle by utilizing an energy source other than the fuel utilized by engine 610.

Fuel system 640 may periodically receive fuel from a fuel source residing external to the vehicle. As a non-limiting example, vehicle propulsion system 600 may be refueled by receiving fuel via a fuel dispensing device 670 as indicated by arrow 672. In some examples, fuel tank 644 may be configured to store the fuel received from fuel dispensing device 670 until it is supplied to engine 610 for combustion. In some examples, control system 690 may receive an indication of the level of fuel stored at fuel tank 644 via a fuel level sensor. The level of fuel stored at fuel tank 644 (e.g., as identified by the fuel level sensor) may be communicated to the vehicle operator, for example, via a fuel gauge or indication in a vehicle instrument panel 696.

The vehicle propulsion system 600 may also include an ambient temperature/humidity sensor 698, and a roll stability control sensor, such as a lateral and/or longitudinal and/or yaw rate sensor(s) 699. The vehicle instrument panel 696 may include indicator light(s) and/or a text-based display in which messages are displayed to an operator. The vehicle instrument panel 696 may also include various input portions for receiving an operator input, such as buttons, touch screens, voice input/recognition, etc. For example, the vehicle instrument panel 696 may include a refueling button 697 which may be manually actuated or pressed by a vehicle operator to initiate refueling. For example, as described in more detail below, in response to the vehicle operator actuating refueling button 697, a fuel tank in the vehicle may be depressurized so that refueling may be performed.

Control system 690 may be communicatively coupled to other vehicles or infrastructures using appropriate communications technology, as is known in the art. For example, control system 690 may be coupled to other vehicles or infrastructures via a wireless network 631, which may comprise Wi-Fi, Bluetooth, a type of cellular service, a wireless data transfer protocol, and so on. Control system 690 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 690 may be communicatively coupled to other vehicles or infrastructures via a wireless network 631 and the internet (e.g. cloud), as is commonly known in the art. One example of a V2V communication device may include dedicated-short-range-communication (DSRC) network which may allow vehicles within a threshold range (e.g., 5,000 feet) to communicate (e.g., transfer information) free of an internet connection.

Vehicle system 600 may also include an on-board navigation system 632 (for example, a Global Positioning System) that an operator of the vehicle may interact with. The navigation system 632 may include one or more location sensors for assisting in estimating vehicle speed, vehicle altitude, vehicle position/location, etc. This information may be used to infer engine operating parameters, such as local barometric pressure. As discussed above, control system 690 may further be configured to receive information via the internet or other communication networks. Information received from the GPS may be cross-referenced to information available via the internet to determine local weather conditions, local vehicle regulations, etc.

In some examples, vehicle propulsion system 600 may include one or more onboard cameras 635. Onboard cameras 635 may communicate photos and/or video images to control system 690, for example. Onboard cameras may in some examples be utilized to record images within a predetermined radius of the vehicle, for example.

In some examples, vehicle propulsion system 600 may further include a fast response emissions sensor 691. The fast response emissions sensor 691 may be substantially similar to fast response emissions sensor 331 of FIG. 3. The fast response emissions sensor 691 may be arranged in only lower-emission, higher-efficiency vehicles of a vehicle fleet comprising a plurality of vehicles, wherein locations corresponding to the emissions causal events are relayed to other vehicles with lower efficiency travelling toward the location so that they may preemptively adjusting engine operating parameters.

Control system 690 may be configured as a conventional microcomputer including a microprocessor unit, input/output ports, read-only memory, random access memory, keep alive memory, a controller area network (CAN) bus, etc. Control system 690 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

FIGS. 1 and 3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In this way, an emissions causal event may be enhanced via preemptive adjustments to engine operating parameters such that emission during the emissions causal event are reduced to a threshold range. Furthermore, for a fleet of vehicles, one or more vehicles with higher efficiency (e.g., lower emissions values) may be equipped with a fast response emissions sensor, wherein emissions causal events for the higher efficiency vehicles may be relayed to other vehicles travelling toward a same location. The technical effect of providing the fast response emissions sensor to only high efficiency vehicles is to decrease manufacturing costs while still providing emissions causal event data to less efficient vehicles. By doing this, emissions may be reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a motor vehicle, the method comprising:
   determining a route of the motor vehicle;
   identifying an emissions causal event along the route, via sensing, by a previous vehicle, the emissions causal event based on an emissions value being greater than a baseline emissions value for less than a threshold period of time or for less than a threshold distance;
   the emissions causal event corresponding to a period of operation of the motor vehicle during which an emissions value of the motor vehicle is increased relative to a baseline emissions value of the motor vehicle;
   identifying a location of the emissions causal event; and
   pre-emptively adjusting one or more operating parameters of the motor vehicle in order to reduce the emissions value of the motor vehicle when the motor vehicle travels through the identified location;
   wherein the emissions causal event corresponds to the period of operation of the motor vehicle during which the emissions value of the motor vehicle is increased for a length of time less than the threshold period of time; and
   wherein the emissions causal event corresponds to the period of operation of the motor vehicle during which the motor vehicle travels a distance less than the threshold distance over which the emissions value is higher than the baseline emissions value.

2. The method of claim 1, wherein the threshold period of time is less than or equal to 10 seconds.

3. The method of claim 1, wherein the threshold distance is less than or equal to 200 m.

4. The method of claim 1, wherein identifying the emissions causal event comprises analyzing one or more emissions values and associated locations stored in a database accessible to the motor vehicle.

5. The method of 1, further comprising determining whether an emissions causal event is a temporary event temporarily affecting motor vehicles travelling through the location associated with the emissions causal event, wherein a temporary event includes a parade, a sporting event, a concert, a construction zone, a weather event, school operating hours, and traffic.

6. The method of claim 1, further comprising predicting emissions values relating to emission of two or more different pollutants during the emissions causal event; and pre-emptively adjusting two or more operating parameters of the motor vehicle to balance the emission of the two or more different pollutants when the motor vehicle travels through the identified location to decrease the emissions value to closer to the baseline emissions value.

7. The method of claim 1, wherein the one or more operating parameters of the motor vehicle comprise one or more of a fuel injector pattern, a fuel injection quantity, a fuel injection timing, a fuel rail pressure, a valve timing, a spark timing, a turbocharger boost pressure, an exhaust gas recirculation rate, a power truncation, a battery power truncation, and a battery charge limit.

8. The method of claim 1, wherein the emissions value comprises a rate of emission of one or more of ozone, nitrogen oxides, unburnt hydrocarbons, particulate matter, carbon dioxide, and carbon monoxide.

9. A system, comprising:
   a vehicle comprising an emissions sensor configured to sense an emissions value for each stroke of an engine, wherein the vehicle is a higher efficiency vehicle included in a vehicle fleet; and
   a controller with computer-readable instructions stored on non-transitory memory thereof that when executed enable the controller to:
      sense an emissions causal event based on the emissions value being greater than a baseline emissions value for less than a threshold period of time or for less than a threshold distance; and
      relay a location of the emissions causal event from the higher efficiency vehicle to lower efficiency vehicles of the vehicle fleet.

10. The system of claim 9, wherein the threshold period time is less than 10 seconds, and wherein the threshold distance is less than 200 meters.

11. The system of claim 9, wherein vehicles of the vehicle fleet communicate via one or more of a dedicated short-range network, Wi-Fi, and Bluetooth.

12. The system of claim 9, wherein the higher efficiency vehicle is a low-duty vehicle and a lower efficiency vehicle is a high-duty vehicle.

13. The system of claim 9, wherein the location is relayed to only lower efficiency vehicles traveling along a route comprising the location, wherein efficiency is based on a vehicle fuel consumption.

14. The system of claim 9, wherein the instructions further enable the controller to pre-emptively adjust one or more engine operating parameters in anticipation of the emissions causal event, wherein the engine operating parameters include one or more of a fuel injector pattern, a fuel injection quantity, a fuel injection timing, a fuel rail pressure, a valve timing, a spark timing, a turbocharger boost pressure, an exhaust gas recirculation rate, a power truncation, a battery power truncation, and a battery charge limit.

15. A system, comprising:
   a plurality of vehicles communicatively coupled to one another, wherein at least one vehicle of the plurality of vehicles is the only vehicle comprising an emissions sensor; and
   a controller with computer-readable instructions stored on non-transitory memory thereof that when executed enable the controller to:
      sense an emissions causal event based on an emissions value sensed by the emissions sensor being greater than a baseline emissions value for less than a threshold period of time or for less than a threshold distance; and
      relay a location of the emissions causal event from the at least one vehicle to other vehicles of the plurality of vehicles;
      pre-emptively adjust engine operating parameters in the other vehicles of the plurality of vehicles upon approaching the location.

16. The system of claim 15, wherein the emissions causal event is a permanent event or a temporary event.

17. The system of claim 15, wherein the engine operating parameters are adjusted for only a duration or a distance of the emissions causal event.

18. The system of claim 15, wherein the emissions sensor is configured to correlate an emissions value to a piston stroke.